US007476417B2

(12) United States Patent
Dettling et al.

(10) Patent No.: US 7,476,417 B2
(45) Date of Patent: Jan. 13, 2009

(54) METHOD OF MANUFACTURING MONOLITHIC CATALYSTS

(75) Inventors: Joseph C. Dettling, Howell, NJ (US); Victor Rosynsky, Ewing, NJ (US); Chung-Zong Wan, Somerset, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 0 days.

(21) Appl. No.: 11/626,658

(22) Filed: Jan. 24, 2007

(65) Prior Publication Data

US 2007/0116870 A1 May 24, 2007

Related U.S. Application Data

(63) Continuation of application No. 09/873,979, filed on Jun. 1, 2001, now abandoned, which is a continuation of application No. 09/067,820, filed on Apr. 28, 1998, now abandoned, which is a continuation-in-part of application No. 09/067,831, filed on Apr. 28, 1998, now Pat. No. 5,953,832, which is a continuation-in-part of application No. 08/962,363, filed on Oct. 31, 1997, now Pat. No. 5,866,210, which is a continuation of application No. 08/668,385, filed on Jun. 21, 1996, now abandoned.

(51) Int. Cl.

| | |
|---|---|
| ***B05D 7/22*** | (2006.01) |
| ***B05D 1/36*** | (2006.01) |
| ***B05D 1/38*** | (2006.01) |
| ***B05D 3/04*** | (2006.01) |
| ***B05D 3/12*** | (2006.01) |
| *F26B 3/04* | (2006.01) |

(52) U.S. Cl. ....................... 427/238; 427/256; 427/258; 427/348; 427/350

(58) Field of Classification Search ....................... None
See application file for complete search history.

(56) References Cited

U.S. PATENT DOCUMENTS

| | | | | |
|---|---|---|---|---|
| 3,331,787 A | | 7/1967 | Keith et al. | |
| 3,565,830 A | | 2/1971 | Keith et al. | |
| 4,039,482 A | * | 8/1977 | Hoyer et al. | 502/332 |
| 4,066,801 A | | 1/1978 | Hoyer et al. | |
| 4,134,860 A | | 1/1979 | Hindin et al. | |
| 4,171,288 A | | 10/1979 | Keith et al. | |
| 4,189,404 A | | 2/1980 | Keith et al. | |
| 4,191,126 A | | 3/1980 | Reed et al. | |
| 4,384,014 A | | 5/1983 | Young | |
| 4,515,758 A | | 5/1985 | Domesle et al. | |
| 4,550,034 A | | 10/1985 | Schimrock et al. | |
| 4,588,707 A | | 5/1986 | Domesle et al. | |
| 4,609,563 A | * | 9/1986 | Shimrock et al. | 427/8 |
| 4,624,940 A | | 11/1986 | Wan et al. | |
| 4,714,694 A | | 12/1987 | Wan et al. | |
| 4,727,052 A | | 2/1988 | Wan et al. | |
| 4,857,089 A | | 8/1989 | Kitagawa et al. | |
| 4,902,487 A | | 2/1990 | Cooper et al. | |
| 5,024,981 A | | 6/1991 | Speronello et al. | |
| 5,057,483 A | | 10/1991 | Wan | |
| 5,089,237 A | | 2/1992 | Schuster et al. | |
| 5,120,695 A | | 6/1992 | Blumrich et al. | |
| 5,376,610 A | | 12/1994 | Takahata et al. | |
| 5,597,771 A | | 1/1997 | Hu et al. | |
| 5,746,989 A | | 5/1998 | Murachi et al. | |
| 5,866,210 A | | 2/1999 | Rosynsky et al. | |
| 5,953,832 A | | 9/1999 | Rosynsky et al. | |
| 6,044,644 A | | 4/2000 | Hu et al. | |
| 2007/0128345 A1 | * | 6/2007 | Dings et al. | 427/8 |

FOREIGN PATENT DOCUMENTS

| | | |
|---|---|---|
| EP | 0 327 880 | 8/1989 |
| EP | 0 444 494 | 9/1991 |
| EP | 0 834 343 | 11/1997 |
| WO | WO 92/09848 | 6/1992 |
| WO | WO 92/09848 A1 * | 6/1992 |
| WO | WO 95/00235 | 1/1995 |
| WO | WO 95/35152 | 12/1995 |
| WO | WO 96/17671 | 6/1996 |
| WO | WO 97/48500 | 12/1997 |
| WO | WO 99/39809 | 8/1999 |
| WO | WO 99/47260 | 9/1999 |
| WO | WO 00/29726 | 5/2000 |
| WO | WO 01/12320 | 2/2001 |

OTHER PUBLICATIONS

U.S. Appl. No. 08/843,501, filed Apr. 16, 1997, Spenser, Michael D.

* cited by examiner

*Primary Examiner*—William Phillip Fletcher, III
(74) *Attorney, Agent, or Firm*—Scott Servilla; Diehl Servilla LLC; Melanie Brown

(57) ABSTRACT

The present invention is directed to a method of coating a substrate, such as a honeycomb having a plurality of parallel channels defined by the honeycomb walls. The honeycomb has different zones along the length of the channels. The zones are defined by their coating (or lack of coating) and extend for a length of the channel in which there is the same coating and architecture. Soluble components in coating compositions are fixed in their respective zones by forcing a heated gas stream through the channels.

21 Claims, 5 Drawing Sheets

METHOD OF MANUFACTURING MONOLITHIC CATALYSTS

CROSS REFERENCE TO RELATED APPLICATION

The present application is a continuation of U.S. Ser. No. 09/873,979, filed Jun. 1, 2001, abandoned, which is a continuation of U.S. Ser. No. 09/067,820, filed Apr. 28, 1998, abandoned, which is a continuation-in-part of U.S. Ser. No. 09/067,831, filed Apr. 28, 1998, now U.S. Pat. No. 5,953,832, and a continuation-in-part of U.S. Ser. No. 08/962,363, filed Oct. 31, 1997, now U.S. Pat. No. 5,866,210, which is a continuation of U.S. Ser. No. 08/668,385, filed Jun. 21, 1996, abandoned, all herein incorporated by reference.

FIELD OF THE INVENTION

The present invention is directed to a vacuum infusion method for coating a substrate having a plurality of channels such as a monolithic substrate used in catalytic convertors.

BACKGROUND OF THE INVENTION

Catalytic convertors are well known for the removal and/or conversion of the harmful components of exhaust gases. Catalytic convertors have a variety of constructions for this purpose. In one form the converter comprises the rigid skeletal monolithic substrate on which there is a catalytic coating. The monolith has a honeycomb-type structure which has a multiplicity of longitudinal channels, typically in parallel, to provide a catalytically coated body having a high surface area.

The rigid, monolithic substrate can fabricated from ceramics and other materials. Such materials and their construction are described, for example, in U.S. Pat. Nos. 3,331,787 and 3,565,830 each of which is incorporated herein by reference. Alternatively, the monoliths can be fabricated from metal foil.

The monolithic substrate and particularly the multiplicity of channels can be coated with a slurry of a catalytic and/or absorbent material.

One method of coating a prefabricated monolithic substrate is to pump the catalyst slurry into the respective channels and then subject the coated substrate to a drying operation. Such systems have been unsuccessful in providing a uniform coating thickness and a uniform coating profile wherein the catalyst coating is deposited over the same length of each of the channels.

It has been proposed to employ a vacuum to draw the catalyst slurry upwardly through the channels. For example, Peter D. Young, U.S. Pat. No. 4,384,014 discloses the creation of a vacuum over the monolithic substrate to remove air from the channels and then drawing the catalyst slurry upwardly through the channels. The vacuum is then broken and excess slurry is removed, preferably by gravity drainage.

James R. Reed, et al., U.S. Pat. No. 4,191,126, discloses the dipping of the monolithic substrate into a slurry and then utilizing subatmospheric pressure to purge the excess coating slurry from the surfaces of the support. The applied vacuum is intended to unplug the channels so that the slurry is drawn over the surfaces of each of the channels.

An improvement in these systems is disclosed in Thomas Shimrock, et al., U.S. Pat. No. 4,609,563, incorporated herein by reference. This system encompasses a method of vacuum coating ceramic substrate members with a slurry of refractory and/or catalyst metal components wherein precisely controlled, predetermined amounts of the slurry are metered for application to the ceramic monolithic substrate. The monolithic substrate is lowered into a vessel, also known as a dip pan, of preferably predetermined dimensions to a predetermined depth containing the precise amount of slurry which is to be coated onto the substrate. The slurry is then drawn up by a vacuum which is applied to the end of the substrate opposite to the end which is immersed in the bath. No draining or purging of excess coating slurry from the substrate is necessary nor is any pre-vacuum application step required to eliminate air.

A further improved method is disclosed in U.S. Ser. No. 08/962,363, filed Oct. 31, 1997, now U.S. Pat. No. 5,866,210, which is a continuation of U.S. Ser. No. 08/668,385 filed Jun. 21, 1996 and entitled, "METHOD FOR COATING A SUBSTRATE". There is disclosed a vacuum infusion method for coating monolithic substrates in which each of the channels comprising the substrate is coated with the same thickness of the coating and is characterized by a uniform coating profile. The term "uniform coating profile" as used herein means that each channel of the substrate will be coated over the same length. In particular, the method is directed to a vacuum infusion method for coating a substrate having a plurality of channels with a coating media comprising:

a) partially immersing the substrate into a vessel containing a bath of the coating media, said vessel containing an amount of coating media sufficient to coat the substrate to a desired level without reducing the level of the coating media within the vessel to below the level of the immersed substrate;

b) applying a vacuum to the partially immersed substrate at an intensity and a time sufficient to draw the coating media upwardly from the bath into each of the channels to form a uniform coating profile therein; and c) removing the substrate from the bath.

Optionally, after the coating media is applied to the substrate and as the substrate is being removed from the bath, a vacuum continues to be applied to the substrate at an intensity equal to or greater than the intensity of the vacuum imposed on the partially immersed substrate.

The above referenced parent U.S. Pat. No. 5,866,210 which is a continuation of U.S. Ser. No. 08/668,385 now abandoned, discloses that a substrate may be inverted and coated from an opposite end producing two coatings having uniform coating profile. There is disclosed that if there is any overlap, it is much smaller than with prior art methods.

U.S. Pat. No. 5,953,832 discloses that after coating, the substrate or monolithic honeycomb can be rapidly and thoroughly dried without adversely affecting the coating profile. In particular, the disclosed method dries a monolithic substrate having a plurality of channels and a coating media thereon by removing the coated monolithic substrate from a bath containing the coating media while the coating media is in a wet condition. A vacuum is applied to the coated monolith substrate at an intensity in time sufficient to draw vapor out of the channels without substantially changing the coating profile within the channels. In a specific and preferred embodiment, the vacuum is imposed at one end of the substrate while gas at an elevated temperature is introduced into the opposite end of the substrate to facilitate drying.

Monolithic honeycombs containing different catalyst compositions in zones along the length of the honeycomb are known for use in catalytic combustion processes from references such as WO 92/09848. It is disclosed that graded catalyst structures can be made on ceramic and metal monoliths by a variety of processes. Monoliths can be partially dipped in washcoat and excess washcoat blown out of the channel. The process is repeated by dipping further into the washcoat sol.

Alternatively, catalyst is disclosed to be applied to metal foil which is then rolled into a spiral structure. The washcoat is disclosed to be sprayed or painted onto the metal foil or applied by other known techniques such as by chemical vapor deposition, sputtering, etc.

It is also disclosed in WO 92/09848 that the catalyst can be applied as a mixture of active catalyst (such as palladium) and a high surface support ($Al_2O3$, $ZrO_2$, and $SiO_2$, etc.). These are disclosed to be prepared by impregnating the palladium onto the high surface are oxide powder, calcining, then converting to a colloidal sol. In a second method, the high surface area washcoat may be applied first to the monolith or metal foil and fixed in place. Then the catalyst, e.g., palladium, may be applied by the same dipping or spraying procedure.

Three-way conversion catalysts (TWC) have utility in a number of fields including the treatment of exhaust from internal combustion engines, such as automobile and other gasoline-fueled engines. Emissions standards for unburned hydrocarbons, carbon monoxide and nitrogen oxides contaminants have been set by various governments and must be met, for example, by new automobiles. In order to meet such standards, catalytic converters containing a TWC catalyst are located in the exhaust gas line of internal combustion engines. The catalysts promote the oxidation by oxygen in the exhaust gas of the unburned hydrocarbons and carbon monoxide and the reduction of nitrogen oxides to nitrogen.

Known TWC catalysts which exhibit good activity and long life comprise one or more platinum group metals (e.g., platinum or palladium, rhodium, ruthenium and iridium) located upon a high surface area, refractory oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material.

U.S. Pat. No. 4,134,860 relates to the manufacture of catalyst structures. The catalyst composition can contain platinum group metals, base metals, rare earth metals and refractory, such as alumina support. The composition can be deposited on a relatively inert carrier such as a honeycomb.

In a moving vehicle, exhaust gas temperatures can reach 1000° C. or higher, and such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or rare earth metal oxides, such as ceria, lanthana and mixtures of two or more rare earth metal oxides. For example, see C. D. Keith, et al., U.S. Pat. No. 4,171,288. Reference is also made to a review of three-way catalysts in the Background of U.S. Ser. No. 08/962,283, filed Oct. 31, 1997 entitled, "CATALYST COMPOSITION".

Preferred catalysts and catalyst structures which contain oxygen storage components are disclosed in WO 95/35152, WO 95/00235 and WO 96/17671 hereby incorporated by reference. These references disclose multiple layer catalysts. The discrete form and second coats of catalytic material, conventionally referred to as "washcoats", can be coated onto a suitable carrier with, preferably, the first coat adhered to the carrier and the second coat overlying and adhering to the first coat. With this arrangement, the gas being contacted with the catalyst, e.g., being flowed through the passageways of the catalytic material-coated carrier, will first contact the second or top coat and pass therethrough in order to contact the underlying bottom or first coat. However, in an alternative configuration, the second coat need not overlie the first coat but may be provided on an upstream (as sensed in the direction of gas flow through the catalyst composition) portion of the carrier, with the first coat provided on a downstream portion of the carrier. Thus, to apply the washcoat in this configuration, an upstream longitudinal segment only of the carrier would be dipped into a slurry of the second coat catalytic material, and dried, and the undipped downstream longitudinal segment of the carrier would then be dipped into a slurry of the first coat catalytic material and dried.

There is a need to refine methods and articles to strategically locate catalyst on substrates.

SUMMARY OF THE INVENTION

The present invention is directed to a substrate, preferably a honeycomb comprising a plurality of channels defined by the honeycomb walls. The channels, and wall elements are parallel and typically axial to the axis of the substrate. The honeycomb has an inlet end and an outlet end, with at least some of the channels having a corresponding inlet and outlet. There is a first inlet layer located on the walls and extending for at least part of the length from the inlet end toward the outlet end to an inlet layer axial end. The first inlet layer extends for only part of the length from the inlet end toward the outlet end. The first inlet layer comprises a first inlet composition comprising at least one first inlet component selected from first inlet base metal oxides. The first inlet layer is coated by a method comprising the steps of passing a fluid containing the first inlet composition into the inlet end of the substrate to form the first inlet layer, and then applying a vacuum to the outlet end while forcing a heated gas stream through the channels from the inlet end without significantly changing the length of the first inlet layer. In certain embodiments a one or more layer can be applied over the entire channel length by conventional methods and used in combination with the method of the present invention.

The first inlet base metal oxides can be selected from a first inlet refractory oxide, a first inlet rare earth metal oxide, a first inlet transition metal oxide, a first inlet alkaline earth metal oxide and a molecular sieve. Preferably the first inlet composition comprises at least one first inlet precious metal component.

In a specific and preferred embodiment there can be a second inlet layer located on the walls and extending for at least part of the length from the inlet end toward the outlet end to a second layer axial end. The at least one second layer can be supported directly or indirectly on the first inlet layer for at least part of the length of the first inlet layer, the at least one second layer comprising a second inlet composition comprising at least one second inlet component selected from second inlet base metal oxides. The at least one second inlet layer coated by a method comprising the steps of passing a fluid containing the at least one second inlet composition into the inlet end of the substrate to form the at least one inlet layer and applying a vacuum to the outlet end while forcing a heated gas stream through the channels from the inlet end without significantly changing the length of the at least one second inlet layer.

The at least one second inlet base metal oxides are selected from a second inlet refractory oxide, a second inlet rare earth metal oxide, a second inlet transition metal oxide, a second inlet alkaline earth metal oxide, and a molecular sieve. Preferably the second inlet composition comprises at least one second inlet precious metal component. Preferably there is at least one precious metal component selected from the first inlet precious metal component and the second inlet precious metal component. The at least one precious metal component is preferably selected from the first inlet precious metal component and the second inlet precious metal component and said precious metal components are selected from at least one of platinum, palladium, rhodium, and iridium components.

In another specific embodiment there can be a first outlet layer located on the walls and extending for at least part of the length from the outlet end toward the inlet end to an outlet layer axial end. The first outlet layer extends for only part of the length from the outlet end toward the inlet end. The first outlet layer comprises a first outlet composition comprising at least one first outlet component selected from first outlet base metal oxides. The first outlet layer is coated by a method comprising the steps of passing a fluid containing the first outlet composition into the outlet end of the substrate to form the first outlet layer and applying a vacuum to the outlet end while forcing a heated gas stream through the channels from the outlet end without significantly changing the length of the first outlet layer.

The first outlet base metal oxides are selected from a first outlet refractory oxide, a first outlet rare earth metal oxide, a first outlet transition metal oxide, a first outlet alkaline earth metal oxide, and a molecular sieve. Preferably the first outlet composition comprises at least one first outlet precious metal component.

Another embodiment comprises the second outlet layer located on the walls and extending for at least part of the length from the outlet end toward the inlet end to a second layer axial end. The second layer can be supported directly or indirectly on the first outlet layer for at least part of the length of the first outlet layer. The second layer comprising a second outlet composition comprising at least one second outlet component selected from second outlet base metal oxides. The second outlet layer coated by a method comprising the steps of passing a fluid containing the at least one second outlet composition into the outlet end of the substrate to form the second outlet layer, and then applying a vacuum to the outlet end while forcing a heated gas stream through the channels from the outlet end without significantly changing the length of the second outlet layer. The at least one second outlet base metal oxides are selected from a second outlet refractory oxide, a second outlet rare earth metal oxide, a second outlet transition metal oxide, a second outlet alkaline earth metal oxide, and a molecular sieve. Preferably the second outlet composition comprises at least one second outlet precious metal component. Preferably there is at least one precious metal component selected from the first outlet precious metal component and the second outlet precious metal component and said precious metal components are selected from at least one of platinum, palladium, rhodium, ruthenium and iridium components. In each of the embodiments, for the various layers including the first layer and the second inlet layer, and the first layer and the second outlet layer the heated gas is preferably air but can be any suitable gas such as nitrogen. The temperature of the heated gas is preferably from about 75° C. to about 400° C. The temperature of the heated gas is preferably from 75° C. to 200° C. to dry the various layers. The temperature of the heated gas is preferably from 200° C. to 400° C. to fix the precious metal component of the various layers. The heated gas is passed over the layers for a sufficient time to dry as to fix the precious metal of compositions of the various layers. The at least one precious metal component selected from the first outlet precious metal component and the second outlet precious metal component.

Structurally, the architecture of the layers can vary as desired. For example at least a portion of at least one of the first or second inlet layers over laps with at least one of the first or second outlet layers. A zone can also have a continuous gradient of material concentration versus layer thickness. Preferably the substrate has at least two adjacent zones, a first zone and a second zone, each extending axially along the length of conduit. The first zone can extend from the inlet and the second or outlet zone extends from the outlet along a separate length of the conduit than the first zone with each zone comprising the same catalyst architecture within said zone. The adjacent zones have different compositions and/or architecture. In a specific embodiment at least one layer of said first zone, and at least one layer of said second zone overlap to form at least one intermediate zone between the first zone and the second zone. There can be at least three zones, or there can be an uncoated zone between the first zone and the second zone.

The substrate can comprise a monolithic honeycomb comprising a plurality of parallel channels extending from the inlet to the outlet. The monolith can be selected from the group of ceramic monoliths and metallic monoliths. The honeycomb can be selected from the group comprising flow through monoliths and wall flow monoliths. In specific embodiments the composition of the layers can include the recited precious metals. At least one layer can contain no precious metal component. A preferred article comprises at least one inlet layer and at least one outlet layer. The at least one inlet composition comprises at least one first inlet refractory oxide composition or composite comprising a first inlet refractory oxide selected from the group consisting of alumina, titania, zirconia and silica, a first inlet rare earth metal oxide and at least one first inlet precious metal component. The at least one outlet layer comprises an outlet composition comprises at least one outlet refractory oxide composition or composite comprising an outlet refractory oxide selected from the group consisting of alumina, titania, zirconia and silica, an outlet rare earth metal oxide and at least one outlet precious metal component.

In a specific embodiment the inlet compositions contain substantially no oxygen storage components. More specifically the inlet compositions contain substantially no oxygen storage components selected from praseodymium and cerium components. In specific embodiments at least one of the outlet compositions contain an oxygen storage components. More specifically at least one of the outlet compositions contains oxygen storage components selected from praseodymium and cerium components. Preferably at least one inlet precious metal component is fixed to the at least one of the at least one inlet refractory oxide composition or composite and the first rare earth metal oxide, and the at least one outlet precious metal component is fixed the at least one of the at least one outlet refractory oxide composition or composite and the rare earth metal oxide. The present invention includes a method comprising passing at least one inlet end fluid comprising an inlet end coating composition into a substrate as recited above. For the purpose of the present invention a fluid includes liquids, slurries, solutions, suspensions and the like. The aqueous liquid passes into the channel inlets and extending for at least part of the length from the inlet end toward the outlet end to form at least one inlet end layer coating, with at least one inlet end coating extending for only part of the length from the inlet end toward the outlet end. A vacuum is applied to the outlet end while forcing a gas stream through the channels from the inlet end after the formation of each inlet end coating without significantly changing the length of each inlet layer coating. At least one outlet end aqueous fluid comprising at least one outlet end coating composition is passed into the substrate through the at least some of the channel outlets at the substrate outlet end. The aqueous liquid passes into the channels and extending for at least part of the length from the outlet end toward the inlet end to form at least one outlet end layer coating. The method can further comprise applying a vacuum to the inlet end while forcing a gas stream through the channels from the outlet end after the formation of each outlet end coating without significantly changing the length of each outlet layer coating.

The method can further comprise the step of fixing the at least one precious metal component selected from the inlet precious metal component of the at least one inlet layer and the outlet precious metal component of the at least one outlet layer to said at least one of the respective inlet or outlet component selected from the inlet refractory oxide and inlet rare earth metal oxide components and the outlet refractory oxide and outlet rare earth metal oxide components. The fixing can be conducted prior to coating the inlet and outlet layers. The step of fixing can comprise chemically fixing the precious metal component on the respective refractory oxide and/or rare earth metal oxide. Alternatively, the step of fixing can comprise thermally treating the precious metal component on the respective refractory oxide and/or rare earth metal oxide. The step of fixing comprises calcining the precious metal component on the respective refractory oxide and/or rare earth metal oxide. The step of calcining can be conducted at from 200° C., preferably 250° C. to 900° C. at from 0.1 to 10 hours. The steps of thermally fixing each layer are preferably conducted after coating and prior to coating a subsequent layer. The step of thermally treating the substrate upon completion of coating all layers at from 200° C. to 400° C. at from 1 to 10 seconds. The steps of calcining is preferably the substrate conducted upon completion of coating all layers. The step of calcining is conducted at from 250° C. to 900° C. at from 0.1 to 10 hours.

The honeycomb has different zones along the length of the channels. The wall in the different zones can be uncoated or coated with different catalyst compositions or architectures. The term "architecture" is used to mean the physical design of the coating in a zone considering parameters such as the number of layers of coating compositions, the thickness of the layers, and the order of layers where there are more than one layer. The zones are defined by their coating (or lack of coating) and extend for a length of the channel in which there is the same coating and architecture. For example, a two layered catalyst coating defines a zone until it bounds with an adjacent zone having different compositions or different numbers of layers. Nonadjacent zones can have the same architecture and compositions. An advancement of the present invention is that soluble components in coating compositions are fixed in their respective zones. For example, precious metal which may be present is fixed in its respective zone and even layer within a zone. In this way, a single monolithic honeycomb can be multifunctional with a minimum and preferably no migration of precious metal components from zone to zone, particularly during the process of manufacture. The terms "fixed" and "segregated" shall mean that components within a zone, and within a layer within a zone remain within the zone with a minimum and preferably no migration or diffusion during the processing to manufacture the catalyzed substrate. An advancement of the monolith of the present invention is that there is a minimum of migration precious metal from one zone to another, even where a composition from one zone overlaps with the composition in another zone.

The first or inlet zone preferably comprises an inlet composition comprising at least one inlet refractory oxide composition or composite comprising a first refractory oxide selected from the group consisting of alumina, titania, zirconia, silica, an inlet rare earth metal oxide, a molecular sieve such as a zeolite and at least one first precious metal component, and the second or outlet zone comprises an outlet composition comprising at least one outlet refractory oxide composition or composite comprising an outlet refractory oxide selected from the group consisting of alumina, titania, zirconia, and silica, a rare earth metal oxide, a molecular sieve such as a zeolite and at least one second precious metal component. The at least one first precious metal component can be fixed to the at least one of the at least one first refractory oxide composition and the first rare earth metal oxide. The at least one second precious metal component can be fixed to at least one of the at least one second refractory oxide composition and the second rare earth metal oxide. The first precious metal is in the first layer segregated from the second layer and the second precious metal is in the second layer segregated from the first layer. Where there is more than one layer, e.g. sublayers, in a zone, preferably the precious metal in a layer remains segregated within that layer.

Preferably, the precious metal can be prefixed the supports. Alternatively the method further comprises fixing the soluble components in the layer such as at least one precious metal component selected from the first precious metal component of the inlet layer and the second precious metal component of the outlet layer to said at least one of the respective first or second component selected from the first refractory oxide and first rare earth metal oxide components, and the second refractory oxide and second rare earth metal oxide components, the fixing being conducted prior to coating the inlet and outlet layers. The step of fixing can comprises chemically fixing the precious metal on the respective refractory oxide and/or rare earth metal oxide. More preferably, the step of fixing comprises thermally treating the precious metal on the respective refractory oxide and/or rare earth metal oxide. The step of thermally treating the substrate upon completion of coating one or more layers at from 200° C. to 400° C. at from 1 to 10, and preferably 2 to 6 seconds. The heat is provided by forcing a gas stream, preferably air which is heated to from 200° C. to 400° C. This temperature range has been found to substantially fix the soluble components such as precious metal components. The combination of flow rate and temperature of the gas stream should be sufficient to heat the coating layer and preferably, providing a minimum of heat to the underlying substrate to enable rapid cooling in the subsequent cooling step prior to application of subsequent layers. Preferably, the steps of thermally fixing each layer, preferably followed by cooling with ambient air, are conducted after coating and prior to coating a subsequent layer. The cooling step is preferably conducted using ambient air typically at from 5° C. to 40° C. at from 2 to 20, and preferably 4 to 10 seconds at a suitable flow rate. The combination of the ambient air flow rate and temperature of the gas stream should be sufficient to cool the coating layer. This method permits continuous coating of a plurality of layers on a substrate to form the above described article of the present invention.

A preferred method comprises the step of fixing the at least one precious metal component selected from the first precious metal component of the first layer and the second precious metal component of the second layer to said at least on to the respective first or second component selected from the first refractory oxide and first rare earth metal oxide components, and the second refractory oxide and second rare earth metal oxide components, the fixing being conducted prior to coating the first and second layers.

In yet another embodiment the method comprises the step of applying a vacuum to the partially immersed substrate at an intensity and a time sufficient to draw the coating media upwardly to a predesignated distance from the bath into each of the channels to form a uniform coating profile therein for each immersion step. Optionally, and preferably the substrate can be turned over to repeat the coating process from the opposite end with the second composition. The coated substrate should be thermally fixed after forming the inlet layer, and after turning the substrate over and forming the outlet layer.

The method can include a final calcining step. This can be conducted in an oven between coating layers or after the coating of all the layers on the substrate has been completed. The calcining can be conducted at from 250° C. to 900° C. at from 0.1 to 10 hours and preferably from 450° C. to 750° C. at from at from 0.5 to 2 hours. After the coating of all layers is complete the substrate can be calcined.

DETAILED DESCRIPTION OF THE PREFERRED EMBODIMENTS

Preferred embodiments of the present invention will be understood by those skilled in the art by reference to the accompanying Figures.

Figure 2:
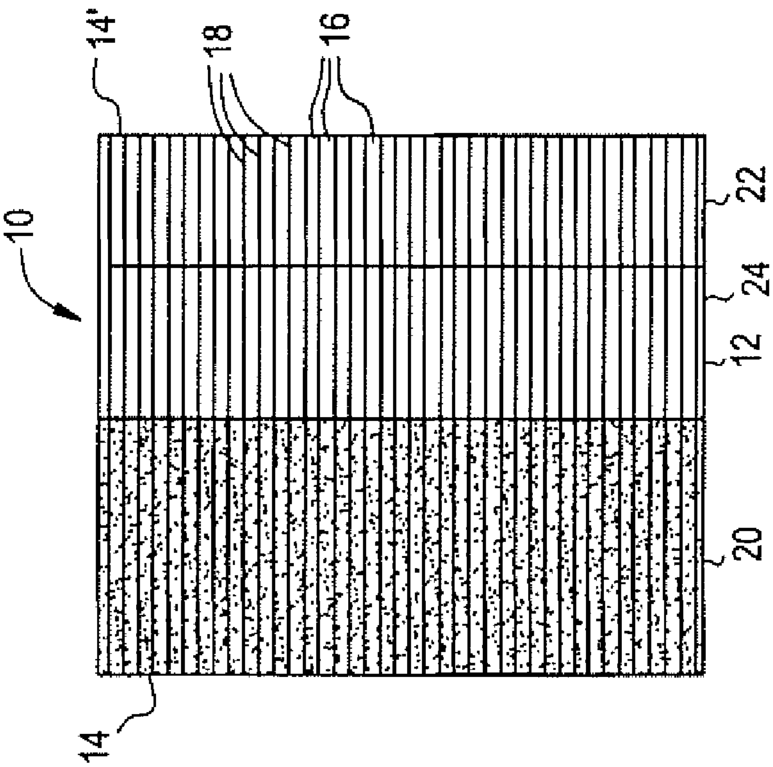
FIG. 2 is a sectional view of the honeycomb of FIG. 1 along Section 2-2.
Figure 1:
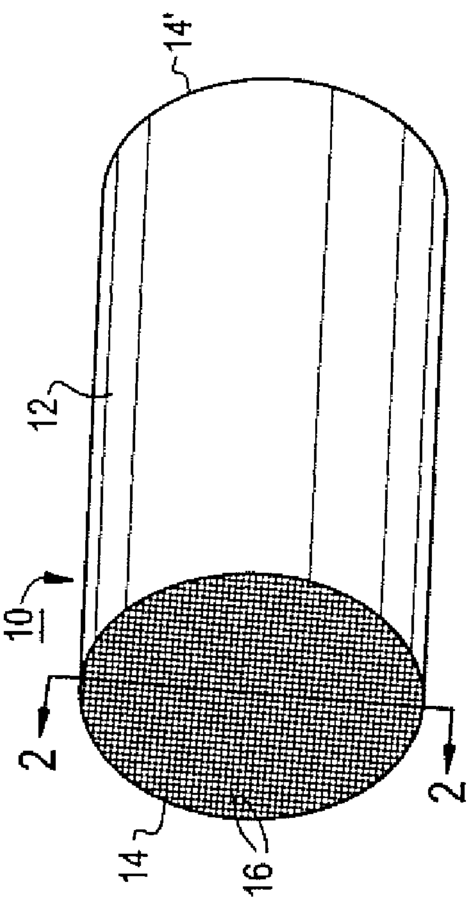
FIG. 1 is a view of in perspective of a honeycomb substrate.

As shown in FIG. 1, the present invention is directed to a substrate, preferably a honeycomb 10 comprising an outer surface 12, an inlet end 14 and an outlet end 14'. There are a plurality of parallel channels 16 defined by the honeycomb walls 18. Each channel has a corresponding inlet and outlet. The honeycomb 10 has different zones along the length of the channels. The walls 18 of the different zones can be uncoated or coated with different catalyst compositions or architectures. The zones are defined by their coating (or lack of coating) and extend for a length of the channel in which there is the same coating and architecture. For example, a two layered catalyst coating defines a zone until it bounds with an adjacent zone having different compositions or different numbers of layers. Nonadjacent zones can have the same architecture and compositions. FIG. 2 shows a sectional view 2-2 of the honeycomb 10 of FIG. 1 containing three zones, a first zone 20 and a second zone 22 which are coated and a third zone 24 which is uncoated and between zones 20 and 22.

An advancement of the present invention is that soluble components in coating compositions are fixed in their respective zones. For example, precious metal which may be present is fixed in its respective zone and even layer within a zone. In this way, a single monolithic honeycomb can be multifunctional with a minimum and preferably no migration of precious metal components or other materials having aqueous solubility or other diffusion characteristics from zone to zone, particularly during the process of manufacture. For the purposes of the present application the components within a zone are segregated, and preferably within a layer within a zone are also segregated in that layer and remain within the zone with a minimum. Most preferably there is a minimum of component migration or diffusion during the processing to manufacture the substrate. There is a minimum of migration precious metal from one zone to another, even where a composition from one zone overlaps with the composition in another zone.

Figure 4:
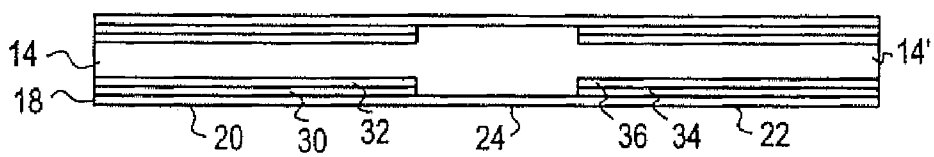
Figure 5:
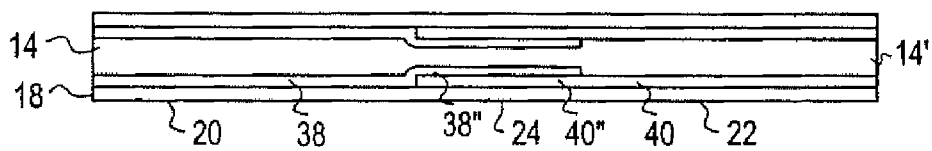
Figure 6:
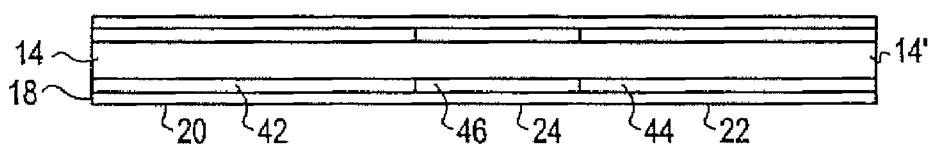

FIGS. 3 to 8 illustrate examples of honeycomb 10 with a plurality of architecture designs. Common elements of FIGS. 3 to 8 and FIGS. 1 and 2 have the same reference characters. FIGS. 3 to 8 illustrate a three zone honeycomb 10 showing a variety of coating architecture on walls 18 in each of the zones 20, 22 and 24. The embodiments of FIGS. 3, 4, 5, 7 and 8 illustrate coating architecture where the coating is fluid, such as a slurry, which passes into the inlet end 14 and/or outlet end 14' of honeycomb 10. It is recognized that in certain embodiments, such as shown in FIG. 6, internal zones can be coated without having to pass into inlet end 14 or outlet end 14' such as by application to foil prior to assembly of a metal, paper or polymeric monolith.

Figure 3:
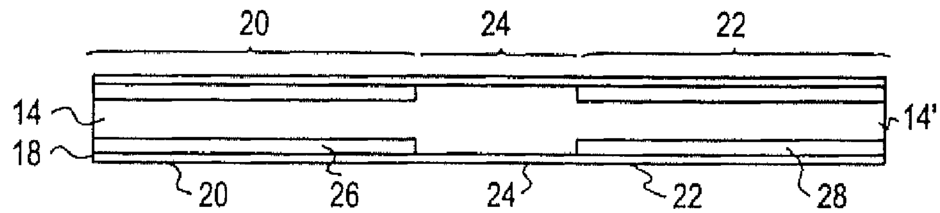
FIGS. 3 to 8 a schematic drawings illustrating various example substrate designs of the present invention.

FIG. 3 illustrates an embodiment wherein the first zone 20 is coated with a single layer 26 of a catalytic composition. The second zone 22 is likewise coated with a single layer of a catalyst composition 28 which may be the same or different than catalyst composition 26. The third zone 24 remains uncoated. FIG. 4 illustrates an alternative embodiment to that of FIG. 3 wherein the first zone 20 comprises a two-layer catalyst coating having an inner layer 30 which, in turn, is coated with an outer layer 32. The second zone 22 likewise is shown having a two-layer catalytic architecture having inner layer 34 coated with outer layer 36. Either zone 20 at the inlet end 14 or zone 22 at the outlet end 14 prime can have one or more catalytic layers or catalytic and non-catalytic layers. The third zone 24 is likewise show without a catalytic layer. As will be described below, zone 24 can have a non-catalytic or catalytic layers.

FIG. 5 illustrates an embodiment wherein the first zone 20 comprises a catalytic layer 38 which extends into zone 24 as a catalytic outer layer 38 double prime. Likewise, the second zone 22 at the outlet has a catalytic 40 which extends into third zone 24 as catalytic inner layer 40 double prime.

FIG. 6 illustrates an embodiment wherein there are three zones, 20, 22 and 24. Zones 20 and 22 are shown to have catalytic coatings 42 and 44, respectively. Inner zone 24 is illustrated as having a catalytic coating 46 which can be the same as either catalytic coating 42 or catalytic coating 44 or be an independent coating which is catalytic or non-catalytic.

Figure 7:
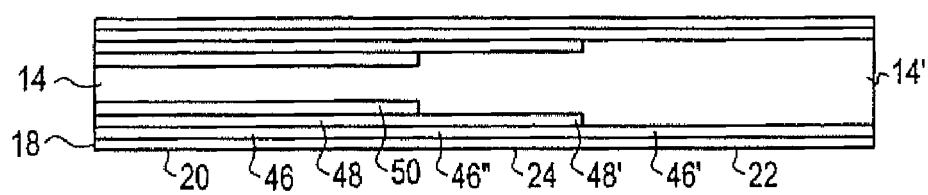
Figure 8:
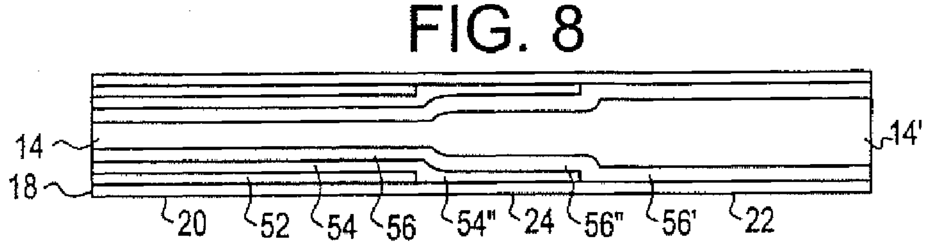
Figure 9A:
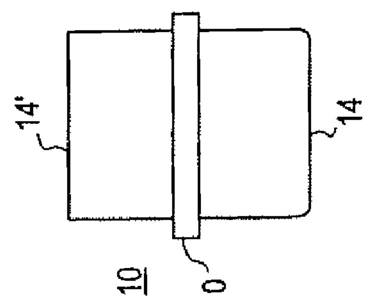
FIG. 9 is a schematic flow chart illustrating the method of the present invention.
Figure 9B:
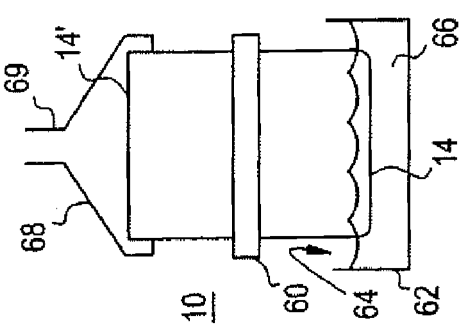
Figure 9C:
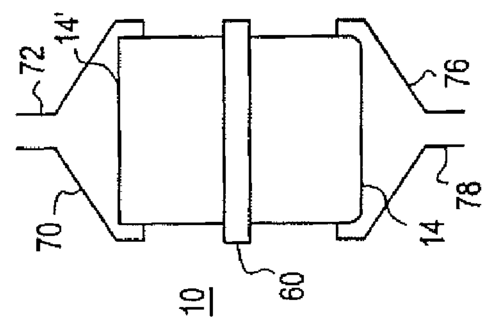
Figure 9D:
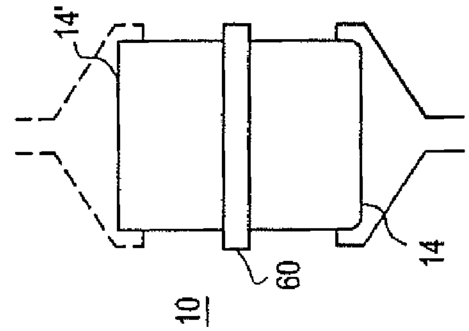
Figure 9E:
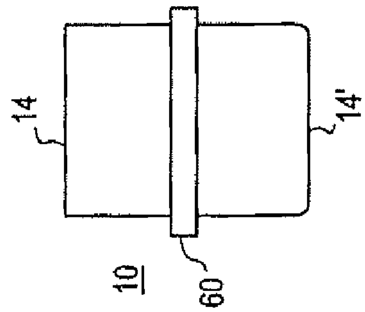

FIGS. 7 and 8 illustrate gradient embodiments. First zone 20 at the inlet end 14 contains three layers, inner layer 46, middle layer 48 and outer layer 50. Inner layer 46 extends for the complete length of zones 20, 22 and 24. In second zone 22 at the outlet end layer 46 prime is the only layer. In the third zone 24 there are two layers; inner layer 46 double prime and outer layer 48 prime which is an extension of middle layer 48 from the first zone 20. In an alternative embodiment first zone 20 contains three layers; 52, 54 and 56. Inner layer 52 extends only through first zone 20. Middle layer 54 extends into third zone 24 as inner layer 54 double prime. Outer layer 56 of zone 20 extends into third zone 24 as outer layer 56 double prime and into second zone 22 as single layer 56 single prime.

As will be reviewed below, the coated zone substrates of the present invention can be produced by a variety of methods. However, as indicated, the composition of the coatings defining each layer and within each zone should be segregated. That is, materials should remain in their respective layers and zones during processing and manufacturing with a minimum and preferably no migration of components from layer to layer and zone to zone. This is particularly important with respect to soluble components such as precious metal salts.

The coated honeycomb substrate of the preferred embodiments of the present invention may be made by a variety of processes. Such processes are preferably directed to the use of a formed monolithic honeycomb such as a ceramic or metallic honeycomb and passing fluid, such as a slurry, composition into the inlet and/or outlet ends to a desired distance to form the respective zones. Alternatively, materials useful to form monolithic honeycombs, such as sheets of metal foil, paper or polymeric material, can be coated with catalytic compositions prior to forming the monolith. Upon forming the monolith, the various compositions are located at the desired zones extending from the inlet toward the outlet within the monolith. For examples a coated substrate such as illustrated in FIG. 6 can be made by a combination of processes. For example, certain zones such as zone 24 can be precoated onto a foil and than the outer zones 20 and 22 can be coated by passing a coating composition into the inlet and outlet of the formed honeycomb. When made using coated materials to assemble the substrate, useful methods of coating elements such as foil include chemical vapor deposition, sputtering, paint coating, rolling, printing and the like. Reference is made to International Publication No. WO 92/09848, hereby incorporated by reference for various methods to make coated honeycombs wherein different compositions are located along the length of honeycomb channels.

As indicated above, it is preferred to the segregate precious metal component of the coating composition within various layers and between zones. Preferably, the catalytic active material, at least in the first layer, can be applied prior to fixing onto a refractory support material and the substrate containing the layer can be thermally treated to convert the precious metal salt to an insoluble precious metal oxide which would result in a minimum of diffusion of precious metal to adjacent layers. Additionally or alternatively the precious metal can be fixed onto support particles such as refractory oxides prior to forming a catalyst slurry composition useful for application of the coating. In this way, when the catalyst composition on the coating is dried, the precious metal would be in oxide form fixed to the refractory oxide support and there would be a minimum of precious metal migration to layers on which the coating is placed on a substrate or into subsequent layers placed on top of a given layer.

A preferred method comprises coating a first zone of a substrate, as recited above, with at least one first layer comprising a first composition. A second zone of the substrate is coated with at least one second layer comprising a second composition. Preferably, the method of the present invention provides for a continuous production of a plurality of honeycombs of the present invention.

FIG. 9 is a schematic flow chart illustrating the various steps A through E in a specific embodiment of the present invention. Common elements in FIG. 9 and various other Figures have the same reference characters. The method of the present invention is useful for a continuous production.

In Step A, honeycombs 10 are continuously fed into an apparatus for coating. The honeycomb 10 is retained by a suitable retaining means such as clamp 60. The honeycomb 10 may be weighed before coating or otherwise prepared. The honeycomb proceeds from Step A to Step B. In Step B honeycomb 10 is immersed in a vessel such a dip pan 62 having a region in the form of a reservoir 64 containing a coating media 66. A suitable means is used to apply a vacuum to the top or outlet end 14' of honeycomb 10. Preferably, hood 68 is sealingly applied to the top or outlet end 14' of honeycomb 10 and a vacuum is applied by a suitable vacuum means, such as a vacuum pump (not shown) through conduit 69 to the top end 14' of the honeycomb 10 to create a pressure drop and thereby draw the coating media 66 from the reservoir 64 into the bottom or inlet end 14 of the honeycomb 10 so as to coat the channels 16 at least over a portion of their length. This coating is conducted in the manner disclosed in U.S. Pat. No. 5,953,832 entitled, "METHOD FOR DRYING A COATED SUBSTRATE", which is incorporated herein by reference. When the coating is to be applied for only part of the channel length, there can be a limited amount of fluid (coating media) in the reservoir. When the fluid is all removed it coats a predetermined length and air is sucked into the channel. The front edge of the fluid which had filled the channels breaks and there is an open path from the inlet to the outlet. The composition forms a coating length on the wall up to the predetermined length. In Step B, the vacuum applied can be from 5 to 15 and typically 5 to 10 inches of water. The coating step takes place from 1 to 10 seconds and preferably 2 to 4 seconds.

The coating applied in Step B is then dried in accordance with Step C. A useful description of the drying step is described in the referenced U.S. Pat. No. 5,953,832. Step C is an operative engagement of the vacuum apparatus for pulling vapors through the substrate and a blowing device for forcing gas (e.g., heated air) through the substrate in order to dry the coating. The honeycomb 10 continues to be retained by a suitable retaining means such as clamp 60 during the drying operation. A suitable means is used to apply a vacuum to the top or outlet end 14' of honeycomb 10. Preferably, hood 68 can continue to be applied or a new hood 70 is sealingly applied to the top or outlet end 14' of honeycomb 10 and a vacuum is applied by a suitable vacuum means, such as a vacuum pump (not shown) through conduit 72 to the top end or outlet end 14' of the honeycomb 10. There is a means for forcing or pushing a gas (e.g., hot air) into the channels 16 of the honeycomb. The apparatus includes a hood 76 which has means to be sealingly applied to the bottom or inlet end 14 of honeycomb 10.

In the operation of Step C, a vacuum is generated by a suitable vacuum generating device to draw gas from the top or outlet end 14' through conduit 72. A blower (not shown) or suitable device is activated to force a hot gas into conduit 78 and into the bottom or inlet end 14 of honeycomb 10. Accordingly, vapors are drawn from the honeycomb 10 outlet 14' through hood 70 and out conduit 72, while hot air is forced upwardly through conduit 78 into the hood 76 and up into the bottom or inlet end 14 of honeycomb 10. As a consequence, vapors within the channels 16 of the honeycomb 10 are drawn out of the channels and hot gas is forced through the channels of honeycomb 14 to dry the coating.

The intensity of the vacuum imposed during the drying step can vary depending upon the cross-sectional areas of the channels 16, the composition and thickness of the coating media applied to each channel. Generally, the intensity of the vacuum will be in the range of from about 5 to about 15 inches of water. A device for imposing a vacuum can be, for example, a Paxton Blower. The hot blowing gas system can be in the form of jet air kerosene heater having a heating capacity of, for example, about 50,000 BTU. In operation, once the substrate is removed from the reservoir of the coating media in Step B, the vacuum draws the vaporized constituents from the channels at a vacuum of from about 5 to 15 inches of water, for typically from 2 to 40 seconds, preferably 2 to 10 seconds, and most preferably 2 to 6 seconds. The vacuum is maintained until the vapors are dissipated. During or after imposition of the vacuum, the hot gas generating system can generate a hot gas (e.g., hot air) at a suitable temperature (e.g., from about 75° to 400° C., most typically from 75° to 200° C.) and at a suitable flow rate to hasten drying of the layer.

Optionally, during Step C, the layer can be heated at suitable temperatures from 200° C. to 700° C., preferably 200° C. to 400° C. to fix precious metal components within the composition. Preferably, the precious metal component is fixed on a refractory oxide support. This can be accomplished in the same manner as in the drying step except that the hot gas temperature is increased.

The coated, dried and coated honeycomb from Step C next goes to Step D where ambient temperature air is applied from 2 to 20 seconds and preferably 5 to 20 seconds and preferably about 8 seconds in order to cool the coating as quickly as possible. This completes a coating step for a layer in the present invention. The ambient air is typically at a temperature range of from 5° to 40° C., of course other preferably inert gases can be used aside from air. Preferably, there is a hood such as hood 70 at the outlet 14'.

An additional coating can be provided through the inlet or bottom end 14. Alternatively, the honeycomb 10 can be rotated in Step E so that the outlet end 14' becomes the bottom end and the inlet end 14 becomes the top end to put coating through the outlet side. The process can be repeated to create a desired coating architecture on the coated honeycomb.

A specific embodiment of the method of the present invention comprises passing at least one inlet end aqueous liquid comprising an inlet end coating composition into a substrate, such as honeycomb 10 as recited above. The aqueous liquid passes into the channel 16 inlets and extends for at least part of the length from the inlet end toward the outlet end to form at least one inlet end layer coating such as layer 26 shown in FIG. 3, with at least one inlet end coating extending 26 for only part of the length from the inlet end 14 toward the outlet end 14'. The coating is dried by the application of a vacuum to the outlet end while forcing a gas stream through the channels from the inlet end after the formation of each inlet end coating without significantly changing the length of each inlet layer coating.

The method includes passing at least one outlet end aqueous liquid comprising at least one outlet end coating composition into the substrate through the at least some of the channel outlets at the substrate outlet end. The aqueous liquid passes into the channels 16 and extending for at least part of the length from the outlet end 14' toward the inlet end 14 to form at least one outlet end layer coating 28 as shown in FIG. 3. Preferably, the method further comprises drying the coating by applying a vacuum to the inlet end 14 while forcing a gas stream through the channels from the outlet end 14' after the formation of each outlet end coating without significantly changing the length of each outlet layer coating.

Preferably, the method further comprises fixing the soluble components in the layer (e.g. 26) such as at least one precious metal component selected from the first precious metal component of the inlet layer and the second precious metal component of the outlet layer to said at least one of the respective first or second component selected from the first refractory oxide and first rare earth metal oxide components, and the second refractory oxide and second rare earth metal oxide components, the fixing being conducted prior to coating the inlet and outlet layers. The step of fixing can comprises chemically fixing the precious metal on the respective refractory oxide and/or rare earth metal oxide. More preferably, the step of fixing comprises thermally treating the precious metal on the respective refractory oxide and/or rare earth metal oxide. The step of thermally treating the substrate upon completion of coating all layers at from 200° C. to 400° C. at from 1 to 10, and preferably 2 to 6 seconds. The heat is provided by forcing a gas stream, preferably air which is heated to from 200° C. to 400° C. This temperature range has been found to substantially fix the soluble components such as precious metal components. The combination of flow rate and temperature of the gas stream should be sufficient to heat the coating layer and preferably, providing a minimum of heat to the underlying substrate to enable rapid cooling in the subsequent cooling step prior to application of subsequent layers. Preferably, the steps of thermally fixing each layer, preferably followed by cooling with ambient air, are conducted after coating and prior to coating a subsequent layer. The cooling step is preferably conducted using ambient air typically at from 5° C. to 40° C. at from 2 to 20, and preferably 4 to 10 seconds. The combination of the ambient air flow rate and temperature of the gas stream should be sufficient to cool the coating layer. This method permits continuous coating of a plurality of layers on a substrate to form the above described article of the present invention.

Following the step of fixing, there can be a step calcining the precious metal on the respective refractory oxide and/or rare earth metal oxide. This can be conducted between coating layers or more preferably after the coating of all the layers on the substrate has been completed. The calcining can be conducted at from 250° C. to 900° C. at from 0.1 to 10 hours and preferably from 450° C. to 750° C. at from at from 0.5 to 2 hours. After the coating of all layers is complete the substrate can be calcined.

A preferred method comprises the step of fixing the at least one precious metal component selected from the first precious metal component of the first layer and the second precious metal component of the second layer to said at least on to the respective first or second component selected from the first refractory oxide and first rare earth metal oxide components, and the second refractory oxide and second rare earth metal oxide components, the fixing being conducted prior to coating the first and second layers.

In yet another embodiment, the method comprises the step of applying a vacuum to the partially immersed substrate at an intensity and a time sufficient to draw the coating media upwardly to a predesignated distance to from the bath into each of the channels to form a uniform coating profile therein for each immersion step. Optionally, and preferably the substrate can be turned over to partially immerse the substrate into the bath to coat with the second composition. The substrate should be thermally fixed after immersing the substrate inlet end, and after turning the substrate over and immersing the outlet end.

In a preferred method of the present invention the substrate comprises an honeycomb monolith. The method comprises:

a) partially immersing the substrate into a vessel containing a first coating composition, said vessel containing an amount of the coating composition sufficient to coat the first zone of the substrate;

b) partially immersing the substrate into a vessel containing a second coating composition, said vessel containing an amount of the coating composition sufficient to coat the second zone of the substrate;

c) thermally treating at least the substrate after each immersion step.

A vacuum can be applied to the partially immersed substrate at an intensity and a time sufficient to draw the coating media upwardly from the bath into each of the channels to form a uniform coating profile therein for each immersion step.

The substrate can be turned over to prior to partially immersing the substrate into the bath to coat with the second composition. The substrate can be thermally fixed after immersing the substrate inlet end, turning the substrate over and immersing the outlet end. There can be an uncoated portion of the channel between zones one and two.

The honeycomb substrates of the present invention are particularly useful in catalytically treating motor vehicle exhaust gas streams comprising gaseous hydrocarbons, nitrogen oxides and carbon monoxide. Additionally, the substrates of the present invention are useful to treat exhaust gas streams from motor vehicles containing particulate subject matter in the dry form, such as soot or volatile organic fractions, both of which are found in diesel engine exhaust gas streams. Finally, the present invention is useful in applications where ozone may be present in a gas stream, such as in environmental air treated prior to being directed into an aircraft or vehicle cabin or in various processes known to treat the environment such as disclosed in U.S. Ser. No. 08/682,174.

As indicated, a particularly preferred use of the present invention is for the treatment of motor vehicle exhaust gas stream pollutants. Catalysts necessary to treat such pollutants typically have a goal to convert multiple pollutants to harmless products. Additionally, such catalysts have to operate at different conditions and in different parts of the exhaust gas stream. For example, useful catalysts to treat gaseous hydrocarbons, nitrogen oxides and carbon monoxides are known as three-way catalysts and are located at various parts of the exhaust system. Such catalysts may be located close to the engine and are referred to as close coupled catalysts or may be located downstream of the engine, typically under the floor of the passenger compartment and referred to as underfloor catalysts. Such embodiments are shown in FIGS. 10 and 11.

Figure 10:
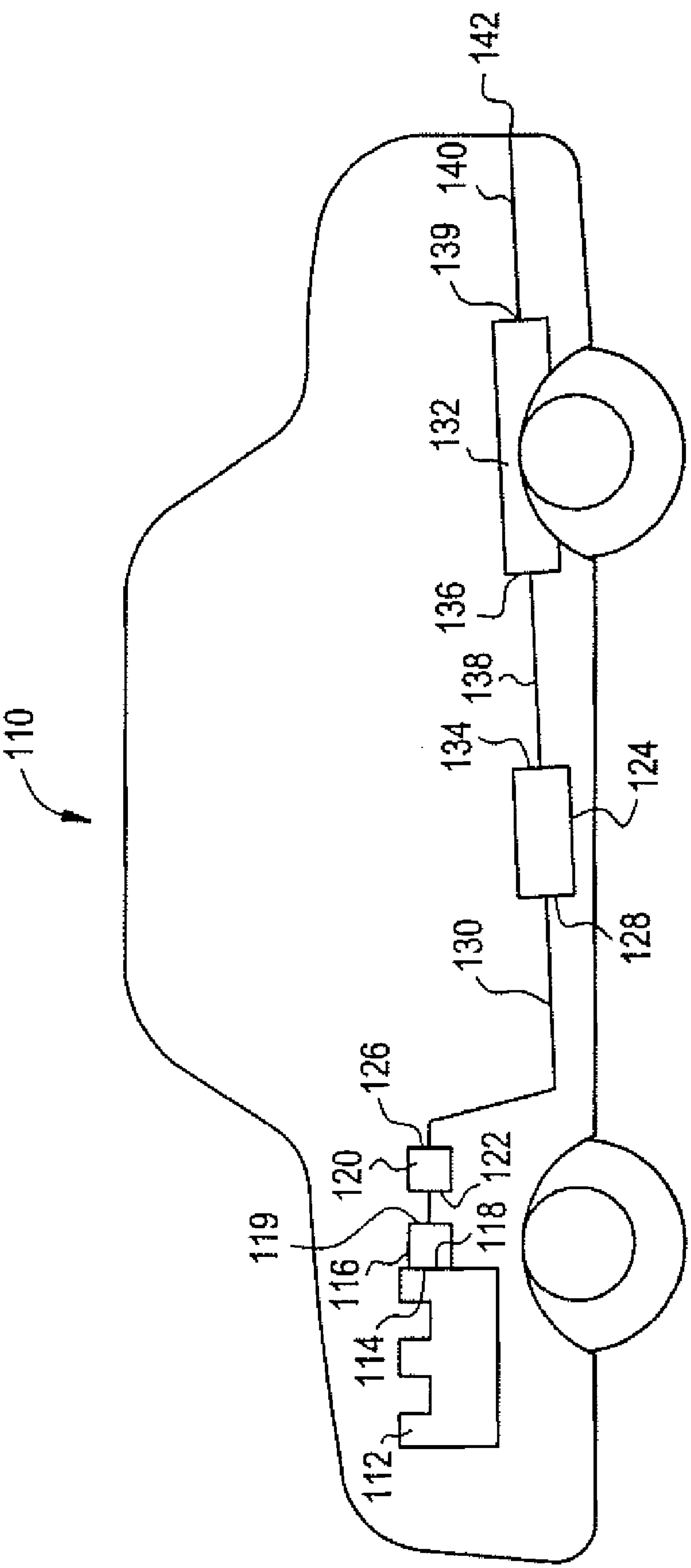
FIG. 10 is a schematic illustration of a motor vehicle containing both a close coupled catalyst and an under the floor catalyst.
Figure 11:
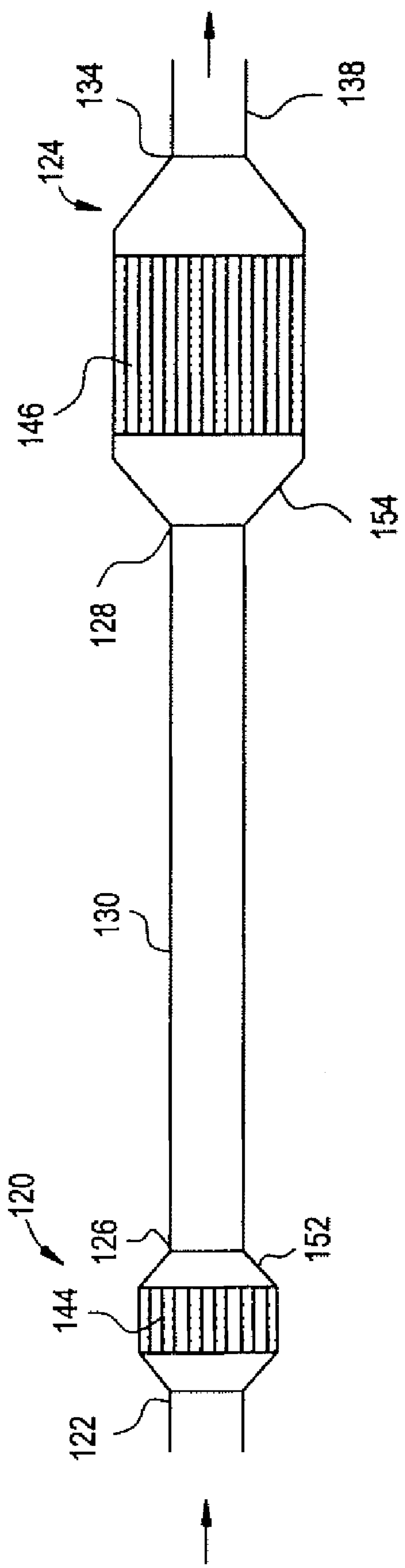
FIG. 11 is a schematic illustration of a motor vehicle exhaust line containing both a close coupled catalyst and an under the floor catalyst.

Reference is made to FIG. 10 which illustrates a particular and preferred embodiment of the present invention. FIG. 10 shows a motor vehicle 110 having a gasoline engine 112. The gasoline engine 112 has an engine exhaust outlet 114. In typical and preferred embodiments, the engine exhaust outlet 114 communicates to an engine exhaust manifold 116 through manifold inlet 118. A close-coupled catalyst is in close proximity to the engine exhaust manifold outlet 119. The manifold outlet 119 is connected and communicates with close-coupled catalyst 120 through close-coupled catalyst inlet 122. The close-coupled catalyst 120 is connected to and communicates with a downstream catalyst, such as underfloor catalytic converter 124. The close-coupled catalyst has a close-coupled catalyst outlet 126 which is connected to the underfloor catalyst 124 through the close-coupled catalyst exhaust pipe 130 to under floor catalyst inlet 128. The underfloor catalyst 124 is typically and preferably connected to muffler 132. In particular, the underfloor catalyst outlet 134 is connected to the muffler inlet 136 through underfloor exhaust pipe 138. The muffler has a muffler outlet 139 which is connected to tailpipe 140 having a tailpipe outlet 142 which opens to the environment. FIG. 11 shows a schematic drawing of the close-coupled catalyst 120 in combination with underfloor catalyst 124. In this preferred embodiment, the close-coupled catalyst comprises a close-coupled honeycomb support 144 on which is coated the close-coupled catalyst composition. The underfloor catalyst 124 comprises an underfloor honeycomb 146 on which is coated an three-way catalyst composition. The close-coupled catalyst honeycomb of FIG. 2 can be sealingly mounted in close-coupled canister 152 which has close-coupled catalyst inlet 122 and close-coupled catalyst outlet 126 connected by close-coupled catalyst exhaust pipe 130 to the inlet 128 of three-way catalyst 124 which is sealingly mounted in underfloor catalyst canister 154. Underfloor exhaust pipe 138 is connected to underfloor catalyst outlet 134. Alternatively, the close coupled catalyst composition can be in an upstream zone of a close coupled catalyst support 144. A three-way catalyst can be located on the same honeycomb support 144 in a downstream zone. This can reduce or eliminate catalyst in the underfloor position.

Any suitable substrate or carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 1200 or more gas inlet openings ("cells") per square inch of cross section. The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

The carriers useful for the catalysts made by this invention may be metallic in nature and be composed of one or more metals or metal alloys. The metallic carriers may be in various shapes such as pellets or in monolithic form. Preferred metallic supports include the heat-resistant, base-metal alloys, especially those in which iron is a substantial or major component. Such alloys may contain one or more of nickel, chromium, and aluminum, and the total of these metals may advantageously comprise at least about 15 weight percent of the alloy, for instance, about 10 to 25 weight percent of chromium, about 3 to 8 weight percent of aluminum and up to about 20 weight percent of nickel, say at least about 1 weight percent of nickel, if any or more than a trace amount be present. The preferred alloys may contain small or trace amounts of one or more other metals such as manganese, copper, vanadium, titanium and the like. The surfaces of the metal carriers may be oxidized at quite elevated temperatures, e.g., at least about 1000° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

Such monolithic carriers may contain up to about 1200 or more flow channels ("cells") per square inch of cross section, although far fewer may be used. For example, the carrier may have from about 60 to 800, more usually from about 200 to 600, cells per square inch ("cpsi").

Discrete layers of catalytic material, conventionally referred to as "washcoats", can be coated onto a suitable carrier. Where there are more than one layer in a given zone, e.g., two layers, preferably, the first coat adheres to the carrier and the second coat overlays and adheres to the first coat.

With this arrangement, the gas being contacted with the catalyst, e.g., being flowed through the passageways of the catalytic material-coated carrier, will first contact the second or top coat and pass therethrough in order to contact the underlying bottom or first coat.

Preferred catalysts and catalyst structures are disclosed in WO 95/35152, WO 95/00235 and WO 96/17671 hereby incorporated by reference.

When the compositions are applied as a thin coating to a monolithic carrier substrate, the proportions of ingredients are conventionally expressed as grams of material per cubic inch of catalyst as this measure accommodates different gas flow passage cell sizes in different monolithic carrier substrates. The concentration of precious metal components such as platinum group metal components are based on the weight of the platinum group metal and typically expressed in grams of material per cubic foot.

In accordance with the present invention the catalyst can be in the form of a catalyst composition supported on a substrate such as a ceramic or metal monolith. The catalyst can be a coating on the substrate of one or more catalyst composition layers. A preferred catalyst useful with the system of the present invention is a three-way conversion catalyst (TWC). The TWC catalyst composite of the present invention simultaneously catalyzes the oxidation of hydrocarbons and carbon monoxide and the reduction of nitrogen oxides in a gas stream.

Such compositions typically comprise a catalytically active component. A useful and preferred component is a precious metal, preferably a platinum group metal and a support for the precious metal. Preferred supports are refractory oxides such as alumina, silica, titania, and zirconia. A catalyst system useful with the method and apparatus of the present invention comprises at least one substrate comprising a catalyst composition located thereon. The composition comprises a catalytically active material, a support and preferably an oxygen storage component.

Useful catalytically active components include at least one of palladium, platinum, rhodium, ruthenium, and iridium components, with platinum, palladium and/or rhodium preferred. Precious metals are typically used in amounts of up to 300 g/ft$^3$, preferably 5 to 250 g/ft$^3$ and more preferably 25 to 200 g/ft$^3$ depending on the metal. Amounts of materials are based on weight divided by substrate (honeycomb) volume.

Useful supports can be made of a high surface area refractory oxide support. Useful high surface area supports include one or more refractory oxides selected from alumina, titania, silica and zirconia. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or activated alumina family, such as gamma and eta aluminas, and, if present, a minor amount of other refractory oxide, e.g., about up to 20 weight percent. Desirably, the active alumina has a specific surface area of 60 to 300 m$^2$/g.

Preferred oxygen storage components have oxygen storage and release capabilities. The oxygen storage component is any such material known in the art, preferably at least one oxide of a metal selected from the group consisting of rare earth metals, and most preferably a cerium or praseodymium compound, with the most preferred oxygen storage component being cerium oxide (ceria). The oxygen storage component can be present at least 5 wt. % and preferably at least 10 wt. % and more preferably at least 15 wt. % of the catalyst composition. The oxygen storage component can be included by dispersing methods known in the art. Such methods can include impregnation onto the composition by impregnating the oxygen storage component onto the a support such as a palladium containing support in the form of an aqueous solution, drying and calcining the resulted mixture in air to give a first layer which contains an oxide of the oxygen storage component in intimate contact with the palladium component. Examples of water soluble or dispersible, decomposable oxygen storage components which can be used include, but are not limited to water soluble salts and/or colloidal dispersions of, cerium acetate, praseodymium acetate, cerium nitrate, praseodymium nitrate, etc. U.S. Pat. No. 4,189,404 discloses the impregnation of alumina-based support composition with cerium nitrate.

Alternatively, the oxygen storage component can be a bulk oxygen storage composition comprising an oxygen storage component which is preferably ceria, and/or praseodymia in bulk form. Ceria is most preferred. By bulk form it is meant that the ceria and/or praseodymia is present as discrete particles which may be as small as 1 to 15 microns in diameter or smaller, as opposed to having been dispersed in solution as in the first layer. A description and the use of such bulk components is presented in U.S. Pat. No. 4,714,694, hereby incorporated by reference. As noted in U.S. Pat. No. 4,727,052, also incorporated by reference, bulk form means that particles of ceria are admixed with particles of activated alumina so that the ceria is present in solid or bulk form as opposed to, for example, impregnating alumina particles with a solution of ceria compound which upon calcination is converted to ceria disposed within the alumina particles. Cerium oxide and praseodymium oxide are the most preferred oxygen storage components.

The performance of the catalyst composition can be enhanced by the use of an alkaline earth metal which is believed to act as a stabilizer, at least one rare earth metal component selected from lanthanum, praseodymium and neodymium which is believed to act as a promoter, and at least one zirconium component.

A useful and preferred catalyzed article can be a layered TWC catalyst composite comprises a first (bottom) layer comprising a first layer composition and the second (top) layer comprising a second layer composition. This composite contains palladium in both the first and second layer and in specific embodiments can comprise palladium as substantially the only precious metal. Such articles are disclosed in WO95/00235.

Briefly, the first layer comprises a first platinum group metal component, which comprises a first palladium component, which can be the same or different than that in the second layer. For the first layer to result in higher temperature conversion efficiencies, an oxygen storage component is used in intimate contact with the platinum group metal. It is preferred to use an alkaline earth metal component believed to act as a stabilizer, a rare earth metal selected from lanthanum and neodymium metal components which is believed to act as a promoter, and a zirconium component. The second layer comprises a second palladium component and optionally, at least one second platinum group metal component other than palladium. Preferably the second layer additionally comprises a second zirconium component, at least one second alkaline earth metal component, and at least one second rare earth metal component selected from the group consisting of lanthanum metal components and neodymium metal components. Preferably, each layer contains a zirconium component, at least one of the alkaline earth metal components and the rare earth component. Most preferably, each layer includes both at least one alkaline earth metal component and at least one rare earth component. The first layer optionally further comprises a second oxygen storage composition which comprises a second oxygen storage component. The second oxygen storage component and/or the second oxygen storage composition are preferably in bulk form and also in intimate contact with the first platinum group metal component.

In a preferred embodiment the first layer can comprise a first palladium component and relatively minor amounts of a first platinum group metal other than palladium and/or the second layer can comprise a second palladium component and relatively minor amounts of a second platinum group metal component other than a palladium component. The preferred first and second platinum group components are selected from platinum, rhodium, and mixtures thereof. The preferred first platinum group metal component other than palladium is platinum and the most preferred second platinum group metal component other than palladium is selected from rhodium, platinum, and mixtures thereof. Typically the first layer will contain up to 100 percent by weight of palladium as the platinum group metal. Where a first platinum group metal component other than palladium is used, it is used typically in amounts up to 40 and preferably from 0.1 to 40, more preferably from 5 to 25 percent by weight based on the total weight of the first palladium component and the platinum group metal components other than palladium in the first layer. Where a second platinum group metal component other palladium is used, it is used typically in amounts up to 40 and preferably from 0.1 to 40, more preferably from 5 to 25 percent by weight based on the total weight of the second palladium component and the platinum group metal components other than palladium in the second layer.

The catalyst of this embodiment preferably comprises a palladium component present in each of the first and second layers, in the catalytically-active, promoting component in an amount sufficient to provide compositions having significantly enhanced catalytic activity due to the palladium component. In a preferred embodiment the first palladium component is the only platinum group metal component in the first layer, and the second palladium component is the only platinum group metal component in the second layer. Optionally either or both of the first and second layers can further respectively comprise a first and second useful platinum group metals include, for instance, platinum, ruthenium, iridium and rhodium, and mixtures or alloys of such metals, e.g., platinum-rhodium.

The first layer composition and second layer composition respectively comprise a first support and a second support which can be the same or different components. The support is made of a high surface area refractory oxide support as recited above. The first layer and second layer compositions preferably comprise a support such as alumina, catalytic components, stabilizers, reaction promoters and, if present, other modifiers and excludes the carrier or substrate. When the compositions are applied as a thin coating to a monolithic carrier substrate, the proportions of ingredients are conventionally expressed as grams of material per cubic inch of catalyst as this measure accommodates different gas flow passage cell sizes in different monolithic carrier substrates. For typical automotive exhaust gas catalytic converters, the catalyst composite which includes a monolithic substrate generally may comprise from about 0.50 to about 6.0, preferably about 1.0 to about 5.0 g/in$^3$ of catalytic composition coating.

The catalyst preferably contains a first oxygen storage component, as recited above, in the first or bottom layer which is in intimate contact with a palladium component. The oxygen storage component is any such material known in the art and preferably at least one oxide of a metal selected from the group consisting of rare earth metals and most preferably a cerium or praseodymium compound with the most preferred oxygen storage component being cerium oxide (ceria). The oxygen storage component can be present at least 5 wt. % and preferably at least 10 wt. % and more preferably at least 15 wt. % of the first layer composition. In the composition of the first or bottom layer, the oxygen storage component can be included by dispersing methods known in the art such as by impregnating the oxygen storage component onto the palladium containing support in the form of an aqueous solution, drying and calcining the resulted mixture in air.

In the first or bottom layer, and in the top or second layer there is optionally a first bulk oxygen storage composition comprising an oxygen storage component which is preferably ceria, and/or praseodymia in bulk form as recited. By bulk form it is meant that a composition is in a solid, preferably fine particulate form, more preferably having a particle size distribution such that at least about 95% by weight of the particles typically have a diameter of from 0.1 to 5.0, and preferably from 0.5 to 3 micrometers. Reference to the discussion of bulk particles is made to U.S. Pat. No. 5,057,483 both hereby incorporated by reference.

In addition to the above listed components of the first layer composition and the second layer composition, it is optional that each layer contain a particular composite of zirconia and at least one rare earth oxide containing ceria. Such materials are disclosed for example in U.S. Pat. Nos. 4,624,940 and 5,057,483, hereby incorporated by reference. Particularly preferred are particles comprising greater than 50% of a zirconia-based compound and preferably from 60 to 90% of zirconia, from 10 to 30 wt. % of ceria and optionally up to 10 wt. %, and when used at least 0.1 wt. %, of a non-ceria rare earth oxide useful to stabilize the zirconia selected from the group consisting of lanthana, neodymia and yttria.

Both the first layer composition and second layer composition comprise a component which impart stabilization, preferably a first stabilizer in the first layer and second stabilizer in the second layer. The stabilizer is selected from the group consisting of alkaline earth metal compounds. Preferred compounds include compounds derived from metals selected from the group consisting of magnesium, barium, calcium and strontium. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. While a variety of stabilizers are disclosed, the first layer and second layer composition of the present invention use alkaline earth metal components. The alkaline earth metal components are preferably alkaline earth metal oxide. In a particularly preferred composition, it is desirable to use barium and strontium as the compound in the first and/or the second layer composition. The alkaline earth metal can be applied in a soluble form which upon calcining becomes the oxide. It is preferred that the soluble barium be provided as barium nitrate, barium acetate or barium hydroxide and the soluble strontium provided as strontium nitrate or strontium acetate, all of which upon calcining become the oxides.

In each of the first layer and second layer compositions, the amount of metal oxide thermal stabilizer combined with the alumina may be from about 0.05 to 30 weight percent, preferably from about 0.1 to 25 weight percent, based on the total weight of the combined alumina, stabilizer and catalytic metal component.

Additionally, both the first layer composition and the second layer composition contain a compound derived from zirconium, preferably zirconium oxide. The zirconium compound can be provided as a water soluble compound such as zirconium acetate or as a relatively insoluble compound such as zirconium hydroxide. There should be an amount sufficient to enhance the stabilization and promotion of the respective compositions.

Both the first layer composition and the second layer composition contain at least one first promoter selected from the group consisting of lanthanum metal components and neodymium metal components with the preferred components being lanthanum oxide (lanthana) and neodymium oxide (neodymia). In a particularly preferred composition, there is lanthana and optionally a minor amount of neodymia in the bottom layer, and neodymia or optionally lanthana in the top coat. While these compounds are known to act as stabilizers for the alumina support, their primary purpose in the composition of the present invention is to act as reaction promoters for the respective first and second layer compositions. A promoter is considered to be a material which enhances the conversion of a desired chemical to another. In a TWC the promoter enhances the catalytic conversion of carbon monoxide and hydrocarbons into water and carbon dioxide and nitrogen oxides into nitrogen and oxygen.

The first layer composition and/or the second layer composition of the present invention can contain other conventional additives such as sulfide suppressants, e.g., nickel or iron components. If nickel oxide is used, an amount from about 1 to 25% by weight of the first coat can be effective. As disclosed in U.S. Pat. No. 5,057,483 hereby incorporated by reference.

A particularly useful layered catalyst composite of the present invention comprises in the first layer from about 0.003 to 0.3 g/in$^3$ of the first palladium component; from about 0 to 0.065 g/in$^3$ of the first platinum group metal component other than palladium; from about 0.15 to about 2.0 g./in$^3$ of the first support, i.e., alumina; at least about 0.05 g/in$^3$ of the total first oxygen storage component in intimate contact with the palladium component; from about 0.025 to about 0.5 g/in$^3$ of at least one first alkaline earth metal components; from about 0.025 to about 0.5 g/in$^3$ of the first zirconium component; from about 0.025 to about 0.5 g/in$^3$ of at least one first rare earth metal component selected from the group consisting of lanthanum metal components and neodymium metal components; and comprises in the second layer from about 0.003 to 0.3 g/in$^3$ of the second palladium component and from about 0 to 0.065 g/in$^3$ of a second rhodium component or a second platinum component or mixture thereof, from about 0.15 g/in$^3$ to about 2.0 g/in$^3$ of the second support, i.e., alumina; and from about 0.025 to about 0.5 g/in$^3$ of the second zirconium component. This first and/or second layers can further comprise from about 0.025 g/in$^3$ to about 0.5 g/in$^3$ of a nickel component. The first and/or second layers further can include the particulate composite of zirconia and ceria in amounts from 0.0 to 2.0 g/in$^3$ comprising 60 to 90 wt. % zirconia, 10 to 30 wt. % ceria and from 0 to 10 wt. % rare earth oxides comprising lanthana, neodymia and mixtures thereof. Weight of the palladium component and other platinum group metal components are based on the weight of the metal.

A useful and preferred first layer has:

from about 0.003 to about 0.6 g/in$^3$ of at least one palladium component;

from 0 to about 0.065 g/in$^3$ of at least one first platinum and/or first rhodium component;

from about 0.15 to about 2.0 g/in$^3$ of a first support;

from about 0.05 to about 2.0 g/in$^3$ of the total of the first oxygen storage components in the first layer;

from 0.0 and preferably about 0.025 to about 0.5 g/in$^3$ of at least one first alkaline earth metal component;

from 0.0 and preferably about 0.025 to about 0.5 g/in$^3$ of a first zirconium component; and from 0.0 and preferably about 0.025 to about 0.5 g/in$^3$ of at least one first rare earth metal component selected from the group consisting of ceria metal components, lanthanum metal components and neodymium metal component.

A useful and preferred second layer has:

from about 0.003 g/in$^3$ to about 0.6 g/in$^3$ of at least one second palladium component;

from 0.0 g/in$^3$ to about 0.065 g/in$^3$ of at least one first platinum and/or rhodium component;

from about 0.15 g/in$^3$ to about 2.0 g/in$^3$ of a second support;

from 0.0 and preferably about 0.025 g/in$^3$ to about 0.5 g/in$^3$ of at least one second rare earth metal component selected from the group consisting of lanthanum metal components and neodymium metal components;

from 0.0 and preferably about 0.25 g/in$^3$ to about 0.5 g/in$^3$ of at least one second alkaline earth metal component; and from 0.0 and preferably about 0.025 to about 0.5 g/in$^3$ of a second zirconium component. However, the first layer requires an alkaline earth metal component and/or a rare earth component, and the second layer requires an alkaline earth metal component and/or a rare earth metal component.

The first and/or second layer can have from 0.0 to about 2.0 g/in$^3$ of an oxygen storage composite comprising particulate form of cera-zirconia composite.

The discrete form and second coats of catalytic material, conventionally referred to as "washcoats", are coated onto a suitable carrier with, preferably, the first coat adhered to the carrier and the second coat overlying and adhering to the first coat are provided in one zone. With this arrangement, the gas being contacted with the catalyst, e.g., being flowed through the passageways of the catalytic material-coated carrier, will first contact the second or top coat and pass therethrough in order to contact the underlying bottom or first coat. However, in an alternative configuration, the second coat need not overlie the first coat but may be provided in an upstream first zone (as sensed in the direction of gas flow through the catalyst composition) portion of the carrier, with the first coat provided on a downstream second zone portion of the carrier. Thus, to apply the washcoat in this configuration, an upstream first zone longitudinal segment only of the carrier would be dipped into a slurry of the second coat catalytic material, and dried, and the undipped downstream second zone longitudinal segment of the carrier would then be dipped into a slurry of the first coat catalytic material and dried.

An alternative and useful TWC catalyst can contain more than one precious metal such as disclosed in WO 95/35152. The disclosed catalyst of WO95/35152 comprises a first layer comprising at least one first palladium component. The first layer can optionally contain minor amounts of a platinum component based on the total platinum metal of the platinum components in the first and second layers. The second layer comprises at least two second platinum group metal components with one of the platinum group metal components preferably being a platinum component and the other preferably being a rhodium component.

Platinum group metal component support components in the first and second layers can be the same or different and are preferably compounds selected from the group consisting of silica, alumina and titania compounds. Preferred first and second supports can be activated compounds selected from the group consisting of alumina, silica, silica-alumina, alumino-silicates, alumina-zirconia, alumina-chromia, and alumina-ceria.

A specific and preferred embodiment of the present invention relates to a layered catalyst composite comprising a first inner layer which comprises a first support having at least one palladium component and from 0 to less than fifty weight percent based on platinum metal of at least one first layer platinum component based on the total amount of platinum metal in the first and second layers.

Preferably, the first layer comprises a first support, a first palladium component, at least one first stabilizer, and at least one first rare earth metal component selected from ceria, neodymia and lanthana. The first layer can also comprise a first oxygen storage composition which comprises a first oxygen storage component. The second layer preferably comprises a second support, at least one second platinum component, at least one rhodium component, and a second oxygen storage composition. There can be from fifty to one hundred weight percent based on platinum metal of the second layer platinum component based on the total amount of platinum metal in the first and second layers.

The second layer preferably comprises a "second" oxygen storage composition which comprises a diluted second oxygen storage component. The oxygen storage composition comprises a diluent in addition to the oxygen storage component. Useful and preferred diluents include refractory oxides. Diluent is used to mean that the second oxygen storage component is present in the oxygen storage composition in relatively minor amounts. The composition is a mixture which can be characterized as a composite which may or may not be a true solid solution. The second oxygen storage component is diluted to minimize interaction with the rhodium component. Such interaction may reduce long term catalytic activity. The second layer preferably comprises a second oxygen storage composition comprising a second oxygen storage component such as rare earth oxide, preferably ceria. The second oxygen storage component is diluted with a diluent such as a refractory metal oxide, preferably zirconia. A particularly preferred second oxygen storage composition is a co-precipitated ceria/zirconia composite. There is preferably up to 30 weight percent ceria and at least 70 weight percent zirconia. Preferably, the oxygen storage composition comprises ceria, and one or more of lanthana, neodymia, yttria or mixtures thereof in addition to ceria. A particularly preferred particulate composite comprises ceria, neodymia and zirconia. Preferably there is from 60 to 90 wt. % zirconia, 10-30% ceria and up to 10% neodymia. The ceria not only stabilizes the zirconia by preventing it from undergoing undesirable phase transformation, but also behaves as an oxygen storage component enhancing oxidation of carbon monoxide and the reduction of nitric oxides.

Preferably, the second oxygen storage composition is in bulk form. By bulk form it is meant that the composition is in a solid, preferably fine particulate form, more preferably having a particle size distribution such that at least about 95% by weight of the particles typically have a diameter of from 0.1 to 5.0, and preferably from 0.5 to 3 micrometers. Reference to the discussion of bulk particles is made to U.S. Pat. Nos. 4,714,694 and 5,057,483 both hereby incorporated by reference.

The second oxygen storage component and optional first oxygen storage component are preferably selected from the cerium group and preferably consist of cerium compounds, praseodymium, and/or neodymium compounds. When using cerium group compounds it has been found that if sulfur is present in the exhaust gas stream, objectionable hydrogen sulfide can form. When it is preferred to minimize hydrogen sulfide, it is preferred to additionally use Group IIA metal oxides, preferably strontium oxide and calcium oxide. Where it is desired to use cerium, praseodymium or neodymium compounds at least one of the first or second layers can further comprise a nickel or iron component to suppress hydrogen sulfide. Preferably, the first layer further comprises a nickel or iron component.

Stabilizers can be in either the first or second layers, and are preferably in the first layer. Stabilizers can be selected from at least one alkaline earth metal component derived from a metal selected from the group consisting of magnesium, barium, calcium and strontium, preferably strontium and barium.

Zirconium components in the first and/or second layers is preferred and acts as both a stabilizer and a promoter. Rare earth oxides act to promote the catalytic activity of the first layer composition. Rare earth metal components are preferably selected from the group consisting of lanthanum metal components and neodymium metal components.

A useful and preferred first layer has:

from about 0.0175 to about 0.3 g/in$^3$ of palladium component;

from about 0 to about 0.065 g/in$^3$ of a first platinum component;

from about 0.15 to about 2.0 g/in$^3$ of a first support;

from about 0.025 to about 0.5 g/in$^3$ of at least one first alkaline earth metal component;

from about 0.025 to about 0.5 g/in$^3$ of a first zirconium component; and from about 0.025 to about 0.5 g/in$^3$ of at least one first rare earth metal component selected from the group consisting of ceria metal components, lanthanum metal components and neodymium metal component.

A useful and preferred second layer has:

from about 0.001 g/in$^3$ to about 0.03 g/in$^3$ of a rhodium component;

from about 0.001 g/in$^3$ to about 0.15 g/in$^3$ of platinum;

from about 0.15 g/in$^3$ to about 1.5 g/in$^3$ of a second support;

from about 0.1 to 2.0 g/in$^3$ of a second oxygen storage composition;

from about 0.025 g/in$^3$ to about 0.5 g/in$^3$ of at least one second rare earth metal component selected from the group consisting of lanthanum metal components and neodymium metal components; and from about 0.025 to about 0.5 g/in$^3$ of a second zirconium component.

As above, the discrete form and second coats of catalytic material, conventionally referred to as "washcoats", are coated onto a suitable carrier with, preferably, the first coat adhered to the carrier and the second coat overlying and adhering to the first coat are provided in one zone. With this arrangement, the gas being contacted with the catalyst, e.g., being flowed through the passageways of the catalytic material-coated carrier, will first contact the second or top coat and pass therethrough in order to contact the underlying bottom or first coat. However, in an alternative configuration, the second coat need not overlie the first coat but may be provided in an upstream first zone (as sensed in the direction of gas flow through the catalyst composition) portion of the carrier, with the first coat provided on a downstream second zone portion of the carrier. Thus, to apply the washcoat in this configuration, an upstream first zone longitudinal segment only of the carrier would be dipped into a slurry of the second coat catalytic material, and dried, and the undipped downstream second zone longitudinal segment of the carrier would then be dipped into a slurry of the first coat catalytic material and dried.

The system of the present invention is also useful in combination with a stable close-coupled catalyst, a system comprising such a close-coupled catalyst and a related method of operation as disclosed in WO 96/17671.

Close-coupled catalysts have been designed to reduce hydrocarbon emissions from gasoline engines during cold starts. More particularly, the close-coupled catalyst is designed to reduce pollutants in automotive engine exhaust gas streams at temperatures as low as 350° C., preferably as low as 300° C. and more preferably as low as 200° C. The close-coupled catalyst of the present invention comprises a close-coupled catalyst composition which catalyzes low temperature reactions. This is indicated by the light-off temperature. The light-off temperature for a specific component is the temperature at which 50% of that component reacts.

The close-coupled catalyst is placed close to an engine to enable it to reach reaction temperatures as soon as possible. However, during steady state operation of the engine, the proximity of the close-coupled catalyst to the engine, typically less than one foot, more typically less than six inches and commonly attached directly to the outlet of the exhaust manifold exposes the close-coupled catalyst composition to exhaust gases at very high temperatures of up to 1100° C. The close-coupled catalyst in the catalyst bed is heated to high temperature by heat from both the hot exhaust gas and by heat generated by the combustion of hydrocarbons and carbon monoxide present in the exhaust gas. In addition to being very reactive at low temperatures, the close-coupled catalyst composition should be stable at high temperatures during the operating life of the engine. A catalyst downstream of the close-coupled catalyst can be an underfloor catalyst or a downstream catalyst. As recited above a TWC catalyst can be located on the close coupled honeycomb 144 in a zone downstream of an upstream zone which comprises the close coupled catalyst composition. When the underfloor catalyst is heated to a high enough temperature to reduce the pollutants, the reduced conversion of carbon monoxide in the close-coupled catalyst results in a cooler close-coupled catalyst and enables the downstream catalyst typically the underfloor three-way catalyst to burn the carbon monoxide and run more effectively at a higher temperature. The downstream or underfloor catalyst preferably comprises an oxygen storage component as described above.

The close-coupled catalyst preferably is in the form of a carrier supported catalyst where the carrier comprises a honeycomb type carrier. A preferred honeycomb type carrier comprises a composition having at least about 50 grams per cubic foot of palladium component, from 0.5 to 3.5 g/in$^3$ of activated alumina, and from 0.05 to 0.5 g/in$^3$ of at least one alkaline earth metal component, most preferably, strontium oxide. Where lanthanum and/or neodymium oxide are present, they are present in amounts up to 0.6 g/in$^3$.

The close coupled catalyst, in one or more layer can be used in a first upstream zone. Preferably, a TWC catalyst can be used in one or more downstream zones.

The aqueous coating compositions useful for the present invention can be made by adding a finely-divided, high surface area, refractory oxide support to a solution of a water-soluble, catalytically-promoting metal component, preferably containing one or more platinum group metal components to form a slurry typically having from 20 to 40 weight percent solids. Other additives including stabilizers, oxygen storage components and the like can also be added at this point. Slurries made according to this method using the compositions recited above can be used as the coating compositions in accordance with the method of the present invention.

In making catalysts by this invention, the catalytically-active composite of the fixed or water-insoluble catalytically-promoting metal component and high area support can be coated on the substrate. This can be accomplished by first comminuting the catalytically-active composite or plurality of such composites, as an aqueous slurry which is preferably acidic. This treatment is usually continued until the solid particles in the slurry have particle sizes which are mostly below about 10 or 15 micrometers. The comminution can be accomplished in a ball mill or other suitable equipment, and the solids content of the slurry my be, for instance, about 20 to 50 weight percent, preferably about 35 to 45 weight percent. The pH of the slurry is preferably below about 5 and acidity may be supplied by the use of a minor amount of a water-soluble organic or inorganic acid or other water-soluble acidic compounds. Thus the acid employed may be hydrochloric or nitric acid, or more preferably a lower fatty acid such as acetic acid, which may be substituted with, for example, chlorine as in the case of trichloroacetic acid. The use of fatty acids may serve to minimize any loss of platinum group metal from the support.

Each layer of the present composite can also be prepared by the method in disclosed in U.S. Pat. No. 4,134,860 (incorporated by reference) generally recited as follows.

A finely-divided, high surface area, refractory oxide support is contacted with a solution of a water-soluble, catalytically-promoting metal component, preferably containing one or more platinum group metal components, to provide a mixture which is essentially devoid of free or unabsorbed liquid. The catalytically-promoting platinum group metal component of the solid, finely-divided mixture can be converted at this point in the process into an essentially water-insoluble form while the mixture remains essentially free of unabsorbed liquid. This process can be accomplished by employing a refractory oxide support, e.g., alumina, including stabilized aluminas, which is sufficiently dry to absorb essentially all of the solution containing the catalytically-promoting metal component, i.e., the amounts of the solution and the support, as well as the moisture content of the latter, are such that their mixture has an essential absence of free or unabsorbed solution when the addition of the catalytically-promoting metal component is complete. During the latter conversion or fixing of the catalytically-promoting metal component on the support, the composite remains essentially dry, i.e., it has substantially no separate or free liquid phase.

The mixture containing the fixed, catalytically-promoting metal component can be comminuted as a slurry which is preferably acidic, to provide solid particles that are advantageously primarily of a size of up to about 5 to 15 microns. The resulting slurry is useful to coat the substrate 10, dried and preferably calcined.

Precious metal group or base metal group components, alone or in mixtures, may be formed in separate first and second layers on the substrate. If the metal components are not selectively deposited on the carrier and fixed to the refractory oxide, they may move freely from one layer of the catalyst to the next.

Alternatively, catalytically-promoting metal solution and high area refractory oxide support can combined the catalytically-promoting metal component can be fixed on the support, i.e., converted to essentially water-insoluble form, while the composite remains essentially devoid of free or unabsorbed aqueous medium. The conversion may be effected chemically, by treatment with a gas such as hydrogen sulfide or hydrogen or with a liquid such as acetic acid or other agents which may be in liquid form, especially an aqueous solution, e.g., hydrazine. The amount of liquid used, however, is not sufficient for the composite to contain any significant or substantial amount of free or unabsorbed liquid during the fixing of the catalytically-promoting metal on the support. The fixing treatment may be with a reactive gas or one which is essentially inert; for example, the fixing may be accomplished by calcining the composite in air or other gas which may be reactive with the catalytically-promoting metal component or essentially inert. The resulting insoluble or fixed catalytically-promoting metal component may be present as a sulfide, oxide, elemental metal or in other forms. When a plurality of catalytically-promoting metal components are deposited on a support, fixing may be employed after each metal component deposition or after deposition of a plurality of such metal components.

The particle size of the finely-divided, high surface area, refractory oxide support is generally above about 10 or 15 micrometers. As noted above, when combined with the catalytically-promoting metal-containing solution the high area support is sufficiently dry to absorb essentially all of the solution.

The comminuted catalytic composition can be deposited on the carrier in a desired amount, for example, the composition may comprise about 2 to 30 weight percent of the coated carrier, and is preferably about 5 to 20 weight percent. The composition deposited on the carrier is generally formed as a coating over most, if not all, of the surfaces of the carrier contacted.

The catalytic compositions made by the present invention can be employed to promote chemical reactions, such as reductions, methanations and especially the oxidation of carbonaceous materials, e.g., carbon monoxide, hydrocarbons, oxygen-containing organic compounds, and the like, to products having a higher weight percentage of oxygen per molecule such as intermediate oxidation products, carbon dioxide and water, the latter two materials being relatively innocuous materials from an air pollution standpoint. Advantageously, the catalytic compositions can be used to provide removal from gaseous exhaust effluents of uncombusted or partially combusted carbonaceous fuel components such as carbon monoxide, hydrocarbons, and intermediate oxidation products composed primarily of carbon, hydrogen and oxygen, or nitrogen oxides. Although some oxidation or reduction reactions may occur at relatively low temperatures, they are often conducted at elevated temperatures of, for instance, at least about 150° C., preferably about 200° to 900° C., and generally with the feedstock in the vapor phase. The materials which are subject to oxidation generally contain carbon, and may, therefore, be termed carbonaceous, whether they are organic or inorganic in nature. The catalysts are thus useful in promoting the oxidation of hydrocarbons, oxygen-containing organic components, and carbon monoxide, and the reduction of nitrogen oxides. These types of materials may be present in exhaust gases from the combustion of carbonaceous fuels, and the catalysts are useful in promoting the oxidation or reduction of materials in such effluents. The exhaust from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. The products from the oxidation contain a greater weight ratio of oxygen to carbon than in the feed material subjected to oxidation. Many such reaction systems are known in the art.

What is claimed is:

1. A method of coating a substrate comprising an inlet end, an outlet end, wall elements extending between the inlet end to the outlet end and a plurality of axially enclosed channels defined by the wall elements, at least some of the channels having a channel inlet at the inlet end and a channel outlet at the outlet end, the method comprising:

passing at least a first inlet fluid composition into the inlet end of the substrate to form at least a first inlet end layer on the walls and extending for only part of the length from the inlet end toward the outlet end, the first inlet fluid composition comprising at least one first inlet base metal oxide component and at least one first inlet precious metal component; and applying a vacuum to the outlet end while forcing a heated gas stream through the channels from the inlet end after the formation of each inlet end layer without significantly changing the length of each inlet layer, wherein the temperature of the heated gas is from about 200° C. to about 400° C. to fix the first inlet precious metal component.

2. The method as recited in claim 1 further comprising passing at least one outlet fluid composition into the substrate through the at least some of the channel outlets at the substrate outlet end to form at least one outlet end layer coating; and applying a vacuum to the inlet end while forcing a gas stream through the channels from the outlet end after the formation of each outlet end coating without significantly changing the length of each outlet layer coating.

3. The method as recited in claim 2 wherein at least one outlet end coating extends for only part of the length from the outlet end toward the inlet end.

4. The method as recited in claim 3 wherein at least one outlet layer comprises a first composition comprising at least one first outlet base metal oxide component and optionally at least one first outlet precious metal component.

5. The method as recited in claim 4, further comprising passing at least a second inlet fluid composition into the inlet end of the substrate to form at least a second inlet layer on the first inlet layer and optionally on at least a portion of the first outlet layer.

6. The method as recited in claim 5 further comprising thermally fixing each layer after coating and prior to coating a subsequent layer.

7. The method as recited in claim 6, wherein thermally fixing comprises applying a vacuum to one of the inlet end or the outlet end while forcing a heated gas stream through the channels from the other of the inlet end or the outlet end after the formation of each layer without significantly changing the length of each layer, wherein the temperature of the heated gas is from about 200° C. to about 400° C. to fix the precious metal component in each layer.

8. The method as recited in claim 4, further comprising passing at least a second outlet fluid composition into the outlet end of the substrate to form at least a second outlet layer on the first outlet layer and optionally on at least a portion of the first inlet layer.

9. The method as recited in claim 8 further comprising thermally fixing each layer after coating and prior to coating a subsequent layer.

10. The method as recited in claim 9, wherein thermally fixing comprises applying a vacuum to one of the inlet end or the outlet end while forcing a heated gas stream through the channels from the other of the inlet end or the outlet end after the formation of each layer without significantly changing the length of each layer, wherein the temperature of the heated gas is from about 200° C. to about 400° C. to fix the precious metal component in each layer.

11. The method as recited in claim 7, wherein the thermal treatment is performed from about 1 second to about 10 seconds.

12. The method as recited in claim 10, wherein the thermal treatment is performed from about 1 second to about 10 seconds.

13. The method as recited in claim 10 further comprising calcining the substrate upon completion of coating all layers.

14. The method as recited in claim 13 wherein the calcining is conducted at from 250° C. to 900° C. at from about 0.1 to about 10 hours.

15. The method as recited in claim 2 wherein there is an uncoated portion of the channel between the inlet layer and the outlet layer.

16. A method for coating a substrate comprising an inlet end, an outlet end, axial wall elements extending from the inlet end to the outlet end and a plurality of axially enclosed channels defined by the wall elements, with at least some of the channels having a channel inlet at the inlet end and a channel outlet at the outlet end, comprising:

partially immersing the substrate at the inlet end into a vessel containing a first coating composition containing a soluble component, at least once, to form at least one first layer located on the walls and extending for at least part of the length from the inlet end toward the outlet end, with at least one inlet end coating extending for only part of the length from the inlet end toward the outlet end;

partially immersing the substrate at the outlet end into a vessel containing a second coating composition containing a soluble component, at least once, to form at least one second layer located on the walls and extending for at least part of the length from the outlet end toward the inlet end; and thermally treating the substrate after each immersion step, to form at least two zones, a first zone extending from the inlet end and a second zone, each extending along the channels wherein the second zone extends along a separate length of the channel than the first zone, the thermal treatment fixing the soluble component of the first zone in the first zone and the soluble component of the second zone in the second zone, wherein the thermal treatment comprises applying a vacuum to one of the inlet end or the outlet end while forcing a heated gas stream through the channels from the other of the inlet end or the outlet end after the formation of each layer without significantly changing the length of each layer, wherein the temperature of the heated gas is from about 200° C. to about 400° C.

17. The method as recited in claim 16 further comprising thermally treating the substrate upon completion of coating all layers at from about 200° C. to about 400° C. at from about 1 to 10 seconds.

18. The method as recited in claim 13 further comprising calcining the substrate.

19. The method as recited in claim 18 wherein the calcining is conducted at from 250° C. to 900° C. at from 0.1 to 10 hours.

20. The method as recited in claim 1 wherein the at least one first inlet base metal oxide component is selected from the group consisting of a first inlet refractory oxide, a first inlet rare earth metal oxide, a first inlet transition metal oxide, a first inlet alkaline earth metal oxide, and a molecular sieve.

21. The method as recited in claim 4 wherein the at least one first outlet base metal oxide component is selected from the group consisting of a first outlet refractory oxide, a first outlet rare earth metal oxide, a first outlet transition metal oxide, a first outlet alkaline earth metal oxide, and a molecular sieve.

* * * * *